United States Patent [19]
Adams

[11] Patent Number: 5,797,431
[45] Date of Patent: Aug. 25, 1998

[54] INNER DIAMETER PIPE PLUG

[75] Inventor: Robert B. Adams, Valley Forge, Pa.

[73] Assignee: EST Group, Inc., Harleysville, Pa.

[21] Appl. No.: 946,086

[22] Filed: Oct. 7, 1997

Related U.S. Application Data

[63] Continuation of Ser. No. 494,099, Jun. 23, 1995, Pat. No. 5,676,174.

[51] Int. Cl.[6] .................................................. F16L 55/10
[52] U.S. Cl. .............................. 138/89; 138/90; 138/93; 220/237
[58] Field of Search ................................ 138/89, 90, 93, 138/91; 220/235–237

[56] References Cited

U.S. PATENT DOCUMENTS

| | | | |
|---|---|---|---|
| 2,607,370 | 8/1952 | Anderson | 138/90 |
| 2,855,033 | 10/1958 | Thaxton | 138/90 |
| 2,870,794 | 1/1959 | Thaxton | 138/90 |
| 2,974,685 | 3/1961 | VerNooy | 138/90 |
| 3,323,551 | 6/1967 | Bell et al. | 138/90 |
| 4,282,982 | 8/1981 | Nuesslein | 138/89 X |
| 4,381,800 | 5/1983 | Leslie | 138/90 |
| 4,385,643 | 5/1983 | Noe | 138/90 |
| 4,474,216 | 10/1984 | Noe | 138/90 X |
| 4,602,500 | 7/1986 | Kelly | 138/90 X |
| 4,760,868 | 8/1988 | Saxon | 138/89 |
| 4,817,671 | 4/1989 | Mathison et al. | 138/90 X |
| 5,119,861 | 6/1992 | Pino | 138/93 X |

FOREIGN PATENT DOCUMENTS

| | | | |
|---|---|---|---|
| 904274 | 8/1962 | United Kingdom | 138/90 |

*Primary Examiner*—Patrick F. Brinson
*Attorney, Agent, or Firm*—Howson and Howson

[57] ABSTRACT

An inner diameter plug for sealing a pipe near an open end of the pipe. The plug is capable of being reused within a range of pipe inner diameter tolerances and of providing effective fluid-tight sealing over a range of internal pressures. The plug can be hand tightened and provides self-gripping and self-sealing features.

20 Claims, 2 Drawing Sheets

FIG. 1
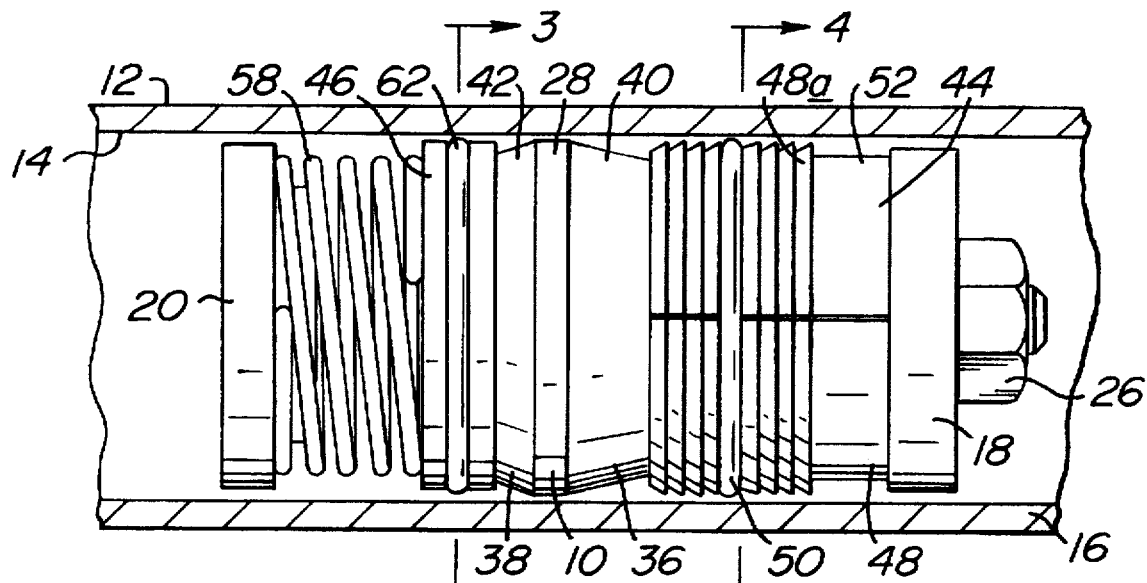
FIG. 2A
FIG. 2B
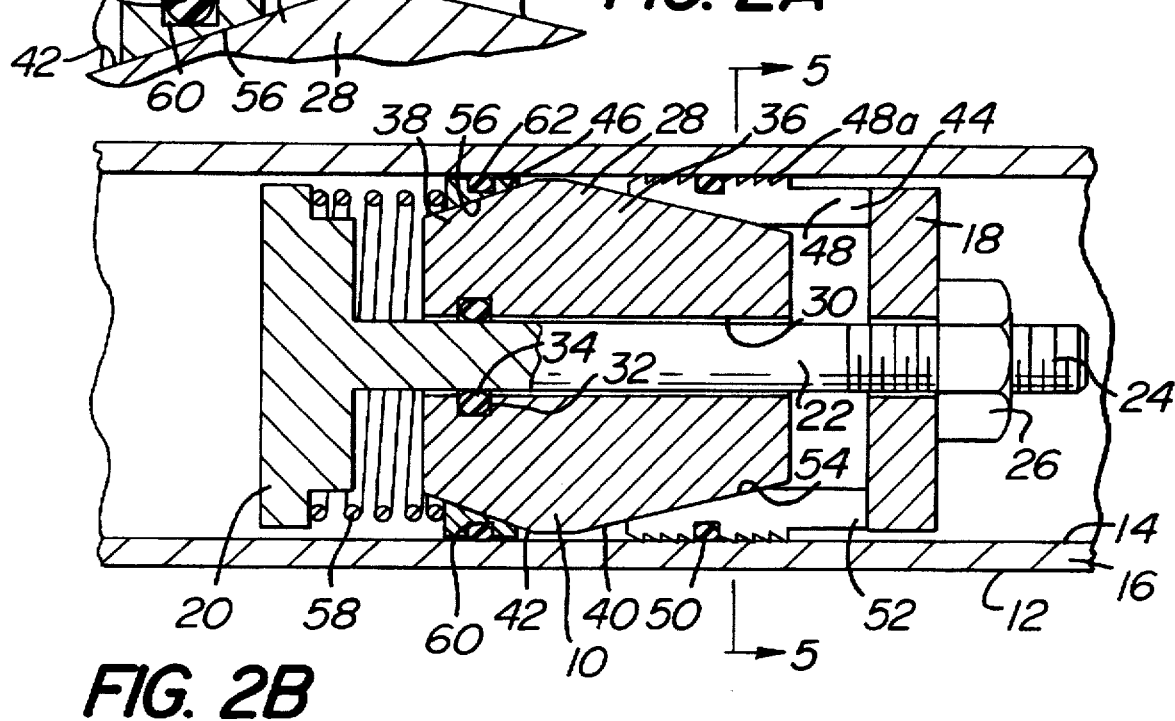

INNER DIAMETER PIPE PLUG

CROSS-REFERENCE TO RELATED APPLICATION

This application is a continuation of U.S. application No. 08/494,099 filed Jun. 23, 1995, now U.S. Pat. No. 5,676,174.

FIELD OF THE INVENTION

The present invention relates to a plug for sealing a pipe near the open end of the pipe, and more particularly, the present invention relates to a reusable quick-connect test plug which forms a fluid-tight high-pressure seal within the inner periphery of the pipe.

BACKGROUND OF THE INVENTION

It is conventional for pipes, tubes and the like to be tested for leaks. Such a practice involves sealing the pipe adjacent the open end of the pipe and pressurizing the pipe with a fluid such as gas, including air or nitrogen, or a liquid such as a hydraulic fluid. These tests often must be performed quickly on a production basis in a pipe manufacturing plant.

Various pipes have different pressure ratings. For instance, depending on the pipe wall material and thickness, as determined by the difference between the inner and outer diameter of the pipe, the pipe may be pressure rated to 10,000 psi, or higher. The test plug that seals the open ends of the pipe must be able to withstand at least the pressure rating of the pipe, to resist blow-out, and to resist leakage.

U.S. Pat. No. 4,381,800 issued to Leslie discloses a test plug capable of forming a seal within a pipe to test a joint in the pipe adjacent the open end of the pipe. The Leslie test plug utilizes a floating mandrel which engages both a set of grippers and an annular compressible sealing element to form a seal along the inner periphery of the pipe.

Other U.S. Patents which disclose inner diameter pipe plugs include U.S. Pat. No.: 2,375,995 issued to Kaeser; U.S. Pat. No. 2,475,748 issued to Leroy; U.S. Pat. No. 2,607,370 issued to Anderson; U.S. Pat. No. 2,824,577 issued to Grunsky; U.S. Pat. No. 3,323,551 issued to Bell; U.S. Pat. No. 3,483,894 issued to Finocchiaro; U.S. Pat. No. 4,385,643 issued to Noe; U.S. Pat. No. 4,452,070 issued to Kipp; U.S. Pat. No. 4,474,216 issued to Noe; U.S. Pat. No. 4,600,036 issued to Noe; U.S. Pat. No. 4,602,500 issued to Kelly; U.S. Pat. No. 4,611,485 issued to Leslie; U.S. Pat. No. 4,625,765 issued to O'Donnell et al.; and U.S. Pat. No. 4,760,868 issued to Saxon.

A problem with creating a fluid-tight seal against the inner periphery of a pipe is that the pipe may not have a perfectly circular cross-section and that the inner diameters of pipes may fall inside or outside a range of design tolerances depending on the ability of the pipe manufacturer to maintain tolerances during manufacture. Therefore, even if a test plug is specifically designed for a certain size pipe, it may not be able to create a fluid-tight seal of sufficient strength due either to the non-uniform shape of the pipe or to its variations from design tolerances, or a combination of these and other factors.

A pipe may have an inner diameter smaller than its design size. This may be true for its entire inner circumference; or it may be true just along certain non-circular portions of the pipe inner periphery. When this occurs, it is often difficult to install an inner diameter test plug having an O-ring within the inner periphery of the pipe, because the O-ring may be too large to fit within the pipe. During installation, a smaller than expected pipe inner periphery also tends to extrude the O-ring outside of its retaining groove.

A pipe may also have an inner diameter which is larger than its design size. In this circumstance, the O-ring may not be sufficiently compressed against the inner periphery of the pipe so that a fluid-tight seal of sufficient strength is not created. In addition, a gap between the plug wall adjacent the O-ring retaining groove and the outer periphery of the pipe may allow the O-ring to extrude outside of the groove, and possibly blow out of the groove entirely when the pipe is pressurized.

While inner diameter plug assemblies having deformable O-rings can function satisfactorily under certain conditions, it has been found that the creation of an effective fluid-tight pressure-resistant seal in a specific size pipe is difficult to accomplish because the stated size is often different from the actual size and shape of the inner periphery of the pipe. A satisfactory inner diameter test plug must be able to accommodate variations in manufacturing tolerances of the inner peripheries of production pipes and be able to maintain a strong fluid-tight seal at pressures as high as 10,000 psi. It is also desirable for an inner diameter test plug assembly to be composed of a minimum of components and to be readily connectable and disconnectable from a pipe without the need for any tools.

OBJECTS OF THE INVENTION

With the foregoing in mind, a primary object of the present invention is to provide an improved inner diameter plug assembly for use in creating a fluid-tight seal within the inner periphery of a pipe adjacent the open end of the pipe.

Another object of the present invention is to provide a novel test plug which can be initially hand tightened and which, when the pipe is pressurized, utilizes the force of the pressure to tighten the engagement of its grippers with the inner periphery of the pipe so that the plug assembly is self-gripping and resists blow outs.

A further object of the present invention is to provide a novel test plug which can be initially hand tightened and which, when the pipe is pressurized, utilizes the force of the pressure to tighten the engagement of the annular seal element with the inner periphery of the pipe so that the plug assembly is self-sealing.

A still further object of the present invention is to provide a unique test plug which can maintain effective pressure sealing over a wide range of pipe inner diameters and inner surface conditions.

Yet another object is to provide a unique inner diameter pipe plug O-ring holding and compressing assembly which contains the O-ring within its groove and prevents the O-ring from extruding outside of the groove either during installation within a pipe or during pipe pressurization.

SUMMARY OF THE INVENTION

More specifically, the present invention provides an inside diameter pipe plug for creating a fluid-tight seal along an inner periphery of a pipe adjacent an open end of the pipe. The plug assembly includes a resilient annular seal element having an outer peripheral groove for retaining a compressible O-ring. The seal element also has an inner peripheral wall which is tapered so that it is in sliding engagement with a camming element. The camming element is axially displaceable within the inner peripheral tapered wall of the seal element and has a first outer frustoconical wall portion which slidably engages the inner peripheral tapered wall of the seal element. The plug assembly includes means for displacing the camming element relative to the seal element and for urging the seal element against the inner periphery of the pipe and thereby urging the O-ring into sealing engagement with the pipe. Thus, the O-ring seats in the groove and against the pipe inner periphery without undergoing unwanted deformation.

BRIEF DESCRIPTION OF THE DRAWINGS

The foregoing and other objects, features and advantages of the present invention should become apparent from the following description when taken in conjunction with the accompanying drawings, in which:

FIG. 1 is an elevational view of an un-tightened inner diameter pipe plug embodying the present invention which is located within the inner periphery of a pipe, the pipe being shown in lengthwise cross-section;

FIG. 2A is a cross-sectional view of a portion of the inner diameter pipe plug illustrated in FIG. 1 after the plug has been hand tightened to form a seal within the pipe, but before the pipe has been pressurized;

FIG. 2B is a cross-sectional view of the inner diameter pipe plug illustrated in FIG. 1 after the plug has been hand tightened and after the pipe has been pressurized;

DETAILED DESCRIPTION OF THE PREFERRED EMBODIMENT

Figure 3:
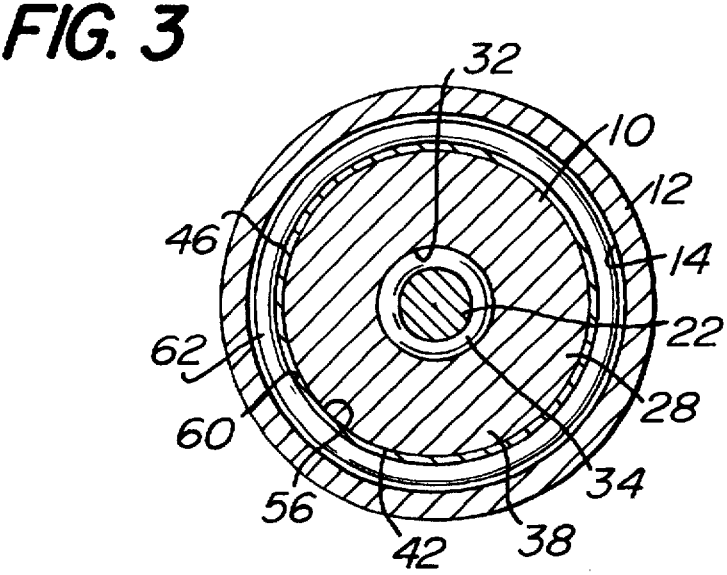
FIG. 3 is a transverse cross-sectional view of the pipe and un-tightened plug assembly illustrated in FIG. 1 taken along the line 3—3.
Figure 4:
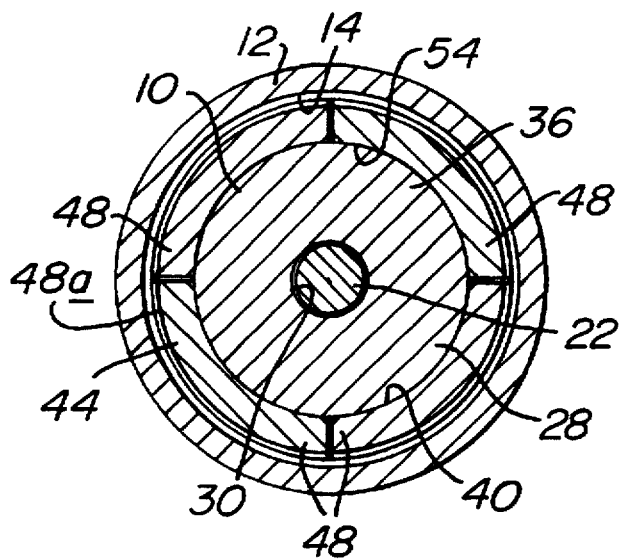
FIG. 4 is a transverse cross-sectional view of the pipe and un-tightened plug assembly illustrated in FIG. 1 taken along the line 4—4.
Figure 5:
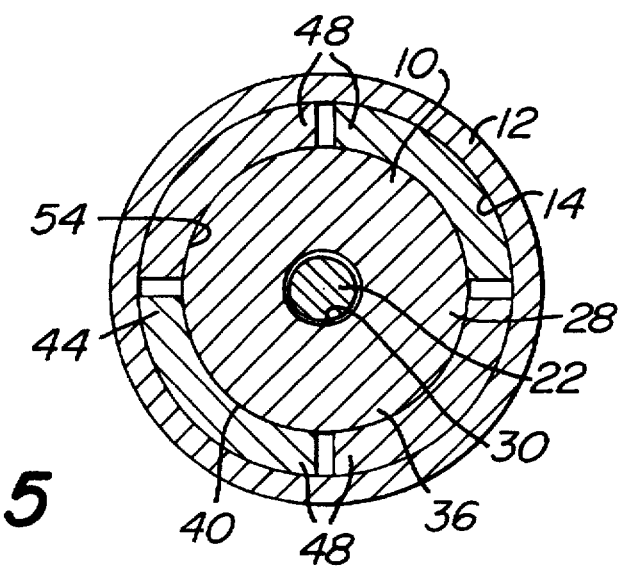
FIG. 5 is a transverse cross-sectional view of the pipe and tightened plug assembly illustrated in FIG. 2 taken along the line 5—5.

Referring now to the drawings, FIGS. 1–5 illustrate one embodiment of a plug 10 according to the present invention. The plug is used to create a fluid-tight seal against an inner periphery 14 of a pipe 12 adjacent its open end 16, and is particularly well suited for use in production pressure testing where quick installation and removal are important.

When the plug 10 is installed, the pipe is pressurized with sufficient pressure to test for leaks. The amount of pressure applied within the pipe depends on the design pressure rating of the pipe. The test plug 10 of the present invention is designed to create a fluid-tight seal sufficient to withstand internal pipe pressures as high as 10,000 psi without requiring tools to mount and dismount the test plug.

As shown in FIG. 1, the plug assembly 10 is capable of fitting into and through the open end 16 of the pipe 12 without interfering with the pipe inner diameter 14. The plug 10 includes a pair of end plates, 18 and 20, end plate 18 being proximal to the open end 16 of the pipe 12 and end plate 20 being distal from the open end 16 of the pipe 12. While proximal end plate 18 is shown in the drawings as fitting within the pipe 12, it can alternatively be configured to confront the open end 16 of the pipe 12.

The plug 10 includes means to displace the end plates 18 and 20 toward one another to effect gripping and sealing engagement of the plug 10 with the inner periphery 14 of the pipe 12. To this end, the end plates are interconnected via a shaft 22 which extends coaxially within the pipe 12. As shown in FIG. 2, the shaft 22 is formed integrally with distal end plate 20 and is in sliding engagement with proximal end plate 18. Alternatively, the shaft and distal end plate can be formed as separate parts which threadably engage or which engage with the use of a nut or bolt head. The end 24 of the shaft 22 is threadably engagable with a nut 26 so that an installer can screw the nut 26 onto the shaft 22 to displace the end plates, 18 and 20, toward one another. Preferably, the installer screws the nut 26 onto the shaft 22 with finger pressure only; however, for larger sized plugs, such as 36 inch plugs, the installer can utilize a standard wrench. The relative movement of the end plates, 18 and 20, causes the plug to grip the pipe and create a fluid-tight seal within the pipe, as will be discussed, even though the pipe 12 may vary in size from nominal tolerances and may not be perfectly circular in cross-section.

The plug assembly 10 includes several additional parts which are located between the end plates, 18 and 20, and which, in concert, effect gripping and sealing. One of these parts is a camming element 28 which slidably engages the shaft 22. To this end, the camming element 28 has a central bore 30 through which the shaft 22 extends and an inner peripheral groove 32 in which an O-ring 34 seats to create a leak-free seal between the camming element 28 and the shaft 22. The camming element 28 has a so-called "double-cone" shape in that it has a pair of back-to-back frustum-shaped segments, 36 and 38, which form an outer frustoconical wall 40 facing the proximal end plate 18 at an angle and an outer frustoconical wall 42 facing the distal end plate 20 at an angle. The frustoconical walls, 40 and 42, are used to cam a set of grippers 44 and a seal element 46 into engagement with the inner periphery 14 of the pipe 12.

The set of grippers 44 are located between, and co-operate with, the camming element 28 and the proximal end plate 18. The set of grippers, as shown in the drawings, include four, annularly-aligned, separate, metal segments 48 interconnected and biased inwardly by a spring clip 50 so that the grippers 44 can be inserted within the pipe 12. Each gripper segment 48 has a series of teeth 48a which are angled in a direction opposite from the distal end plate 20 which is the side of the plug 10 facing the pressurized portion of pipe 12. Each gripper segment 48 has an end portion 52 for abutting the proximal end plate 18 and an inner peripheral tapered wall 54 for slidably engaging the proximal outer frustoconical wall 40 of the camming element 28. Thus, when the end plates, 18 and 20, are inwardly compressed, the grippers 44 are forced up the slope of the outer frustoconical wall 40 radially outward into gripping engagement with the inner periphery 14 of the pipe 12.

The opposite side of the camming element, namely the distal outer frustoconical wall 42, slidably engages an inner peripheral tapered wall 56 of the resilient annular seal element 46. The seal element 46 is made of elastomeric material of sufficient size to initially fit within the inner periphery 14 of the pipe 12. The seal element 46 is urged up the slope of the distal outer frustoconical wall 42 by a driving insert 58 in direct contact with the distal end plate 20 and the seal element 46. As shown in the drawing, the driving insert 58 is preferably a coil spring; however, the driving insert 58 could also be a solid metal annular piece or an annular flange extending integrally from the distal end plate 20. Thus, when the end plates, 18 and 20, are inwardly compressed, the seal element 46 is forced radially outward a sufficient distance to make the outer diameter of an O-ring 62, which is seated on the seal element 46, contact the inner periphery 14 of the pipe 12. The resiliency of the seal element 46 enables it to conform to this larger dimension and return to its as fabricated dimension after the pipe 12 is depressurized and the end plates, 18 and 20, are displaced away from one another.

The seal element 46 has an outer peripheral groove 60 which provides a seat for a compressible O-ring 62 sized to be slightly smaller than the minimum anticipated inner diameter of the pipe 12 to be tested. The advantage of using a resilient seal element 46 as an O-ring carrier is that when the seal element 46 abuts the inner periphery 14 of the pipe 12, it effectively captures the O-ring 62 within the groove 60. When the O-ring 62 is thus captured and compressed, it stays entirely within the groove 60 of the seal element 46 and does not extrude outside of the groove 60. Preferably, the seal element 46 has a higher durometer than the elastomeric material of the O-ring 62.

In use, the plug assembly 10 is placed inside the pipe 12 through its open end 16 with the distal end plate 20 being the leading edge of the plug and the part of the plug that is exposed to the portion of the pipe which is to be pressurized. This initial condition is illustrated in FIG. 1. The nut 26 is then hand tightened to inwardly compress the end plates, 18 and 20, which in turn causes the grippers 44 to be cammed into engagement with the inner peripheral wall 14 of the pipe 12. Hand tightening of the nut 26 also results in the seal element 46 being cammed a sufficient distance to cause the outer diameter of the O-ring 62 to engage the inner peripheral wall 14 of the pipe 12 as illustrated in FIG. 2A. The pipe 12 on the distal end plate side of the plug 10 is then pressurized and tested.

A unique attribute of the plug 10 of the present invention is that its construction provides it with self-gripping and self-sealing features. For instance, after the pipe is pressurized, pressure acting on the camming element 28 further displaces the camming element relative to the grippers 44 so that the teeth 48a 57973315.001 of the grippers bite into the pipe with increasing force with increasing applied pressure in the pipe. Simultaneously, the pressure acting across the annular area of the annular wedge-shaped seal element 46 further displaces the seal element 46 relative to the camming element 28 so that the outer diameter of the wedge-shaped sealing element 46 moves into direct contact with the inner diameter 14 of the pipe as illustrated in FIG. 2B. Thus, the higher the pressure, the tighter the grip and the tighter the seal.

Inner diameter test plugs fabricated in accordance with the present invention are capable of providing an effective seal in pipes having a range of inner diameter tolerances. The plug 10 is preferably made of steel such as carbon or stainless; however, for larger diameter pipes, high-strength light weight materials such as aluminum, titanium and the like may be preferable simply to lighten the weight so as to make the plug easier to handle repeatedly by a workperson. By way of example, and not by way of limitation, the angle of taper of the distal outer frustoconical wall portion 42 of the camming element 28 and the tapered inner peripheral wall 56 of the seal element 46 can be about 17° from the horizontal and the angle of taper of the proximal outer frustoconical wall portion 40 of the camming element 28 and the tapered wall portion 54 of the grippers 44 can be about 20° from the horizontal.

In view of the foregoing, it should be apparent that the present invention now provides a relatively simple yet sturdy inner diameter test plug capable of being reused on a range of pipe tolerances and at relatively high pressure levels. The test plug has a minimum of parts and is reusable repeatedly. Moreover, the test plug can be mounted and dismounted without requiring tools.

While a preferred embodiment of the present invention has been described in detail, various modifications, alterations, and changes may be made without departing from the spirit and scope of the present invention as defined in the appended claims.

I claim:

1. An inside-diameter pipe plug for creating a fluid-tight seal along an inner periphery of a pipe adjacent an open end of the pipe, comprising:

a compressible O-ring for engaging the inner periphery of the pipe;

a resilient annular seal element having an outer peripheral groove for retaining said O-ring and having an inner peripheral tapered wall;

a camming element displaceable axially within said inner peripheral tapered wall of said seal element and having a first outer frustoconical wall slidably engagable with said inner peripheral tapered wall of said seal element; and means for displacing said camming element relative to said seal element for urging said seal element against the inner periphery of the pipe and thereby urging said O-ring into sealing engagement therewith, whereby the O-ring seats in said groove and against the pipe inner periphery without undergoing unwanted deformation.

2. A plug according to claim 1, wherein said means for displacing said camming element relative to said seal element includes:

a shaft extending axially between and connecting together a proximal end plate and a distal end plate, said camming element being in floating engagement on said shaft between said end plates;

means for displacing said end plates toward one another along said shaft; and a driving insert positioned between said distal end plate and said seal element for engaging said seal element and for urging said seal element toward said first outer frustoconical wall of said camming element so that said seal element and said O-ring are compressed against the pipe.

3. A plug according to claim 2, further comprising a set of grippers radially spaced from said shaft and extending between said camming element and said proximal end plate, each of said grippers having a gripping surface for engaging the inner periphery of the pipe, an end portion for engaging the proximal end plate, and a tapered portion for slidably engaging said camming element.

4. A plug according to claim 3, wherein said camming element includes a second outer frustoconical wall which faces said proximal end plate and which is slidably engagable with said tapered portion of each of said grippers.

5. A plug according to claim 4, wherein said first and second outer frustoconical walls of said camming element are formed by a pair of frustum-shaped segments of said camming element positioned in back-to-back relationship.

6. A plug according to claim 2, wherein said driving insert is a coiled spring extending between said distal end plate and said seal element.

7. A plug according to claim 2, wherein said driving insert is a solid annular insert extending between said distal end plate and said seal element.

8. A plug according to claim 2, wherein said driving insert is an annular flange formed integral with, and extending from, said distal end plate.

9. A plug according to claim 2, wherein said proximal end plate is slidably engagable with said shaft; and wherein said means for displacing said end plates toward one another includes a threaded portion of said shaft adjacent said proximal end plate and a nut capable of being threadingly received on said threaded portion of said shaft.

10. A plug according to claim 4, wherein said set of grippers include a plurality of annularly aligned metal segments each having a series of teeth for engaging the inner periphery of the pipe.

11. A plug according to claim 10, further comprising a spring interconnecting said grippers for normally biasing them inwardly away from the inner periphery of the pipe to facilitate insertion and withdrawal of the plug into the pipe.

12. A plug according to claim 2, wherein said camming element has an annular groove adjacent said shaft, said groove having an O-ring therein for providing a fluid-tight seal between said shaft and said camming element floatingly engaged to said shaft.

13. An inside-diameter pipe plug for creating a fluid-tight seal along an inner periphery of a pipe adjacent an open end of the pipe, comprising:

a shaft extending axially between and connecting together a distal end plate and a proximal end plate;

means for displacing said end plates toward one another along said shaft;

a camming element having a pair of frustum-shaped segments which floatingly engage said shaft between said end plates, one of said frustum-shaped segments providing said camming element with a distal outer peripheral frustoconical wall facing said distal end plate and the other of said frustum-shaped segments providing said camming element with a proximal outer peripheral frustoconical wall facing said proximal end plate;

a set of grippers radially spaced from said shaft and extending between said proximal outer peripheral wall of said camming element and said proximal end plate, each of said grippers having a gripping surface with teeth for engaging the inner periphery of the pipe, an end portion for engaging the proximal end plate, and a tapered portion for slidably engaging said camming element;

a resilient annular seal element having an inner peripheral tapered wall slidably engaging said distal outer peripheral frustoconical wall of said camming element; and a driving insert for engaging said seal element and for urging said seal element toward said distal outer peripheral frustoconical wall of said camming element so that said seal element is compressed against the pipe.

14. A plug according to claim 13, wherein said seal element has an outer peripheral groove for retaining a compressible O-ring, whereby said O-ring seats in said groove and against the pipe inner periphery without undergoing unwanted deformation.

15. A plug according to claim 14, wherein said frustum-shaped segments are positioned in a back-to-back relationship.

16. A plug according to claim 15, wherein said driving insert is a coiled spring extending between said distal end plate and said seal element.

17. A plug according to claim 15, wherein said driving insert is a solid annular insert extending between said distal end plate and said seal element.

18. A plug according to claim 15 wherein said driving insert is an annular flange formed integral with, and extending from, said distal end plate.

19. A plug according to claim 15, wherein said proximal end plate is slidably engagable with said shaft; and wherein said means for displacing said end plates toward one another includes a threaded portion of said shaft adjacent said proximal end plate and a nut capable of being threadingly received on said threaded portion of said shaft.

20. An inside-diameter pipe plug for creating a fluid-tight seal along an inner periphery of a pipe adjacent an open end of the pipe, comprising:

a shaft extending axially between and connecting together a distal end plate and a proximal end plate;

means for displacing said end plates toward one another along said shaft;

a camming element having a pair of frustum-shaped segments which floatingly engage said shaft between said end plates, one of said frustum-shaped segments providing said camming element with a distal outer peripheral frustoconical wall facing said distal end plate and the other of said frustum-shaped segments providing said camming element with a proximal outer peripheral frustoconical wall facing said proximal end plate;

a set of grippers radially spaced from said shaft and extending between said proximal outer peripheral wall of said camming element and said proximal end plate, each of said grippers having a gripping surface for engaging the inner periphery of the pipe, an end portion for engaging the proximal end plate, and a tapered portion for slidably engaging said camming element;

a compressible O-ring for engaging the inner periphery of the pipe;

a resilient annular seal element having an inner peripheral tapered wall slidably engaging said distal outer peripheral frustoconical wall of said camming element and having an outer peripheral groove for retaining said O-ring; and a driving insert for engaging said seal element and for urging said seal element toward said distal outer peripheral frustoconical wall of said camming element so that said seal element and said O-ring are compressed against the pipe.

* * * * *